United States Patent

[11] 3,582,086

[72] Inventor William F. Summerfield
Huntington Beach, Calif.

[21] Appl. No. 795,194
[22] Filed Jan. 30, 1969
[45] Patented June 1, 1971
[73] Assignee Mattel, Inc.
Hawthorne, Calif.

[54] TONE ARM POSITIONING ARRANGEMENT IN A TOY SOUND REPRODUCING DEVICE
11 Claims, 5 Drawing Figs.

[52] U.S. Cl. 274/14
[51] Int. Cl. G11b 3/10
[50] Field of Search 274/1, 9, 15, 14

[56] References Cited

UNITED STATES PATENTS

| | | | |
|---|---|---|---|
| 2,066,859 | 1/1937 | Schiler | 274/14 |
| 2,969,241 | 1/1961 | Wyrod | 274/14 |
| 3,082,006 | 3/1963 | Ryan | 274/9 |
| 3,452,991 | 7/1969 | Rabe | 274/9 |

FOREIGN PATENTS

| | | | |
|---|---|---|---|
| 1,231,457 | 12/1966 | Germany | 274/1(.1) |

*Primary Examiner*—Harry N. Haroian
*Attorney*—Seymour A. Scholnick

ABSTRACT: An arrangement in a toy sound reproducing device including a pivotally supported lever which at the end of Play is biased away from the record to automatically disengage the stylus of a tone arm from the record. During Rewind, a manually operable drawstring pivots the lever to an outward position. The lever carries the tone arm therewith. When the lever reaches its outward position, the tone arm is automatically disengaged from the lever to enable the stylus to engage the record even before Play begins.

INVENTOR
WILLIAM F. SUMMERFIELD
BY Max E. Shirk
ATTORNEY

TONE ARM POSITIONING ARRANGEMENT IN A TOY SOUND REPRODUCING DEVICE

BACKGROUND OF THE INVENTION

1. Field of the Invention

The present invention relates to sound-reproducing devices in toys, and, more particularly, to an improved arrangement for controlling the positioning of a tone arm, incorporated in such devices.

2. Description of the Prior Art

The use of sound-reproducing devices in toys, in order to produce talking toys, is well known. Typically, such a sound-reproducing device which is concealably mounted in a toy, includes acustic tape or a disclike record in which a plurality of sayings are recorded in separate, independent sound grooves. Generally, the record has an exposed side with a plurality of congruent spiral grooves extending from outer peripheral radial points to inner radial points. The device also includes a tone arm which supports a needle or stylus, whose function is to produce mechanical signals whenever it is engaged in one of the sound grooves and follows therein as the record turns or rotates in a selected direction, known as the Play direction. The mechanical signals are used, in an associated diaphragm, to produce audio signals which form the saying, recorded in the sound groove which is followed by the stylus. The tone arm is generally biased toward the record, to urge the stylus to engage one of the grooves.

The record is generally supported on a spindle-mounted turntable. In manually powered devices, a spring motor, generally in the form of a rewindable spiral spring, is coupled to the spindle. Manually operable means, such as a drawstring, are connected to the spindle. When the string is drawn or pulled, the spindle turns or rotates in a first direction causing the spring to wind up. Thus, the string pulling represents a Rewind operation. In most prior art devices, the string is also used, during Rewind, to move the tone arm from a radially inward position, which the arm assumes at the end of Play of a saying, to a radially outward position in which the stylus is in a position to engage an outer point of a groove which it is to follow during a subsequent Play cycle.

This is generally accomplished by passing the string through or under the tone arm so that when the string is pulled it first biases the arm away from the record, thereby disengaging the stylus from the groove. Then, as string pulling continues, the tone arm swings radially outwardly to the outward position. When the string is released, which represents the start of Play, the string is slack so that the arm is free to assume its biased position toward the record, causing the stylus to engage one of the grooves. Also, as the string is released, the power spring is free to unwind. As it unwinds, it rotates the spindle and the turntable on which the record is mounted, in a second direction, representing the Play direction. It is during the rotation of the record in the Play direction that one of the recorded sayings is reproduced.

In the prior art, various techniques are employed in the selection of the saying which is reproduced. In some devices, such as those described in U.S. Pat. Nos. 3,168,318 and 3,282,590, means are included to selectively control the outward position, assumed by the tone arm during Rewind to thereby control the groove which the stylus engages. In such devices, the sayings are reproduced in fixed sequences. In other devices, the tone arm is always moved to the same fixed outward position and saying selection is accomplished by indexing the turntable and thereby controlling the record portion which is positioned with respect to or adjacent the tone arm.

OBJECTS AND SUMMARY OF THE INVENTION

It is a primary object of the present invention to provide an improved arrangement for controlling the positioning of a tone arm in a sound reproducing device.

Another object of the invention is the provision of an improved arrangement for controlling the positioning of a tone arm in a sound-reproducing device which operates in conjunction with a manually operable device in a toy.

A further object of the invention is to provide means, in a sound-reproducing device in a toy, which coacts with a drawstring or the like to control the positioning of a tone arm so that a stylus, which is supported thereby, is more accurately positionable with respect to a record on which sayings are recorded.

These and other objects of the invention are achieved by providing, in a sound-reproducing device, of the type herebefore described, a string-activated lever, one function of which is to control the tone arm at the end of Play, when both the lever and the tone arm are in their inward positions to bias the arm away from the record so that the stylus does not engage any of the grooves and clears the record. During Rewind, the lever is rotated, by means of the pulled string, from its inward position to an outward position, carrying the tone arm therewith to the tone arms outward position which when reached, results in effective disengagement between the two, so that the tone arm is free to assume its biased state toward the record to thereby engage its stylus with one of the records grooves. The lever instead of rotating or pivoting to its outward position may be slid thereto.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
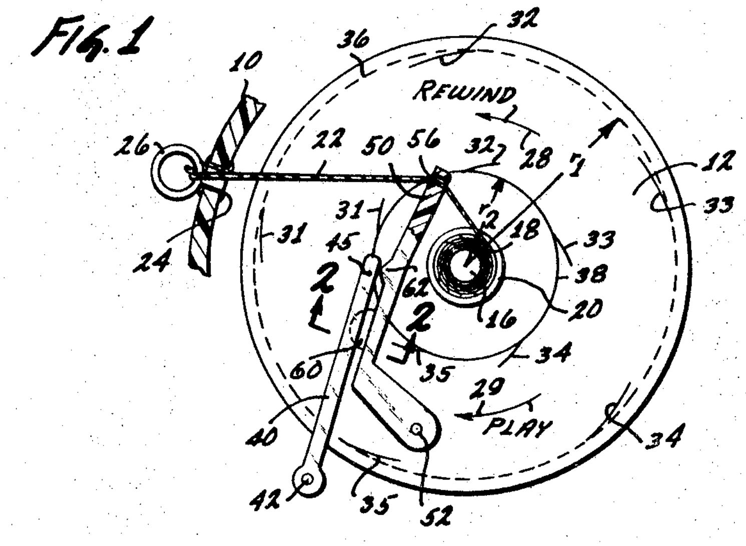
FIG. 1 is a simplified top view of the present invention in an end of Play position.
Figure 2:
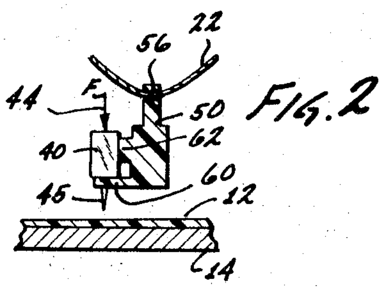
FIG. 2 is a cross-sectional view along lines 2–2 of FIG. 1.

Reference is now made to FIG. 1 which is a simplified top view of only those parts of the sound-reproducing device, needed to diagram and explain the invention and to FIG. 2 which is a cross-sectional view along lines 2–2. Numeral 10 designates a housing, such as a toy body, in which the sound-reproducing device, incorporating the present invention is located. The device includes a multigroove record 12 which is supported on a turntable 14, which is mounted for rotation on a rotatable spindle 16. The centers of the record, turntable and spindle are assumed to lie on a common axis of rotation, the centers being designated by numeral 18.

Connected to the spindle is a string arbor 20 and one end of a drawstring 22 which extends through an eyelet 24 to the housing exterior. The exposed string end terminates in a ring 26 to facilitate the pulling of the string out of the housing 10. The device is assumed to include a power spiral spring (not shown) which is connected to the spindle and which serves as the source of power.

Figures 3, 5:
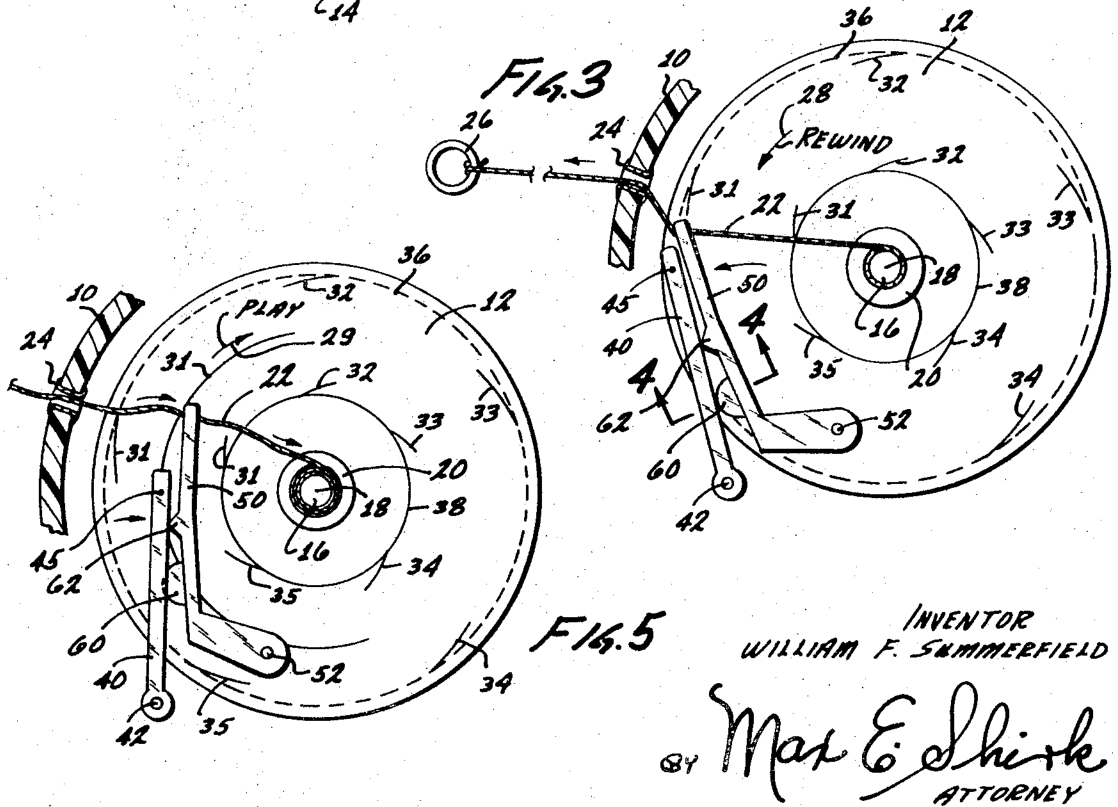
FIG. 3 is a simplified top view of the present invention in an end of Rewind position.
FIG. 5 is a simplified top view of the present invention during Play.

As is appreciated by those familiar with the art, when the string 22 is drawn or pulled out of housing 10 by a playing child, during Rewind, the spindle 16 rotates in a Rewind direction, which in the arrangement shown in FIG. 1 is counterclockwise, designated by arrow 28. The pulled or drawn string 22 is shown in FIG. 3 to which reference is made herein. As the spindle rotates in the Rewind direction, it winds up the power spring. Then, when the string is released, at the start of Play, the power spring starts to unwind, thereby rotating the spindle, and the record mounted on the turntable, which is connected to the spindle, in the Play or clockwise direction, designated by arrow 29.

The record 12, shown in FIGS. 1 and 3, is assumed to contain a plurality of congruent spiral sound grooves such as 31-

—35, each one of which has a separate saying recorded therein. For the purposes of this application it may be assumed that the outer ends of the grooves 31—35 are at a radial distance $r_1$ from center 18, and that the grooves' inner ends terminate in a common inner circular groove 38 of a radius $r_2$.

The sound-reproducing device further includes a tone arm 40 pivotally mounted for rotation about a pivot 42. The arm is assumed to be biased toward the record 12 by a force F which may be applied by any suitable means, not shown, which in FIGS. 1 and 3 is assumed to be in a downward direction, and which is designated by arrow 44 in FIG. 2. Thus, unless an upward force is applied to the arm a stylus 45 (see FIG. 2) which is carried by arm 40 engages the record surface to engage one of the grooves therein. In operation, the tone arm 40 is pivotally rotated about pivot 42 so that at the start of Play the stylus 45 is at a radial distance $r_1$ as shown in FIG. 3, wherein the distance $r_1$ is represented by a circular-dashed line designated by numeral 36. As Play starts, the stylus engages the outer end of a selected spiral groove and follows it toward its inner end to produce the mechanical signals, necessary for the saying reproduction. At the end of the saying reproduction, the stylus is in the inner circular groove 38, as shown in FIG. 1.

In some applications it may be desirable to form a common outer circular groove at a radial distance $r_1$, at which the outer ends of the grooves 31—35 terminate. In such an arrangement the stylus 45 engages the outer circular groove before the start of Play. The tone arm is biased inwardly, so that as Play starts the stylus is urged to enter a selected one of the spiral grooves. For the purpose of describing the present invention, however, it is sufficient to assume that when the arm is in its outward position the stylus 45 is as a radial distance $r_1$ from center 18.

It should be pointed out that unlike prior art arrangements in which the tone arm is directly engageable by the string 22 to control the arms positions, in the present invention, the arm is never engaged by the string. Rather, in the present invention, it is a novel tone-arm-positioning lever 50, hereafter simply referred to as lever 50, which is used to control the arms positions in a manner to be explained hereafter in detail. Ignoring briefly the presence of tone arm 40, the lever 50 is mounted for pivotal rotation about a pivot 52, with sufficient frictional damping so that the lever does not move unless a force is applied thereto either by the string 22, or the tone arm 40, as will be explained hereafter.

The lever 50 has an opening or bore 56 through which the string 22 passes. The relative elevational positions of the string arbor 20 and the eyelet 24 with respect to bore 56 are such that when the string is taut, as shown in FIGS. 1—3, the lever 50 is biased upwardly, i.e., away from the record 12 by string 22. In the present invention, it is assumed that the string is taut at the end of Play by controlling the string length and the power spring to ensure that the latter supplies sufficient torque to rotate the spindle 16 until all the string 22 is pulled in and the ring 26 abuts against housing 10. Clearly, the string is taut during Rewind and just before the start of Play as long as it is pulled by a playing child.

As seen from the various figures, the lever 50 defines a shelf 60 extending from the lever side facing the tone arm 40 and a protuberance 62 which also extends from the same side. Briefly stated, the function of the shelf 60, which is physically positioned to be just below the tone arm at the end of Play, is to raise the arm when the lever 50 is biased upwardly by the taut string 22. Consequently, the stylus 45 is disengaged from the record 12 as shown in FIG. 2. During Rewind, as the lever 50 rotates counterclockwise, by the pulling force applied by the drawn string 22, the arm continues to remain on the shelf of the upwardly biased lever 50. During this part of the operation protuberance 62 engages the side of arm 40. The relative locations of the pivots 42 and 52, the sizes and shapes of the tone arm, the lever, its shelf and protuberance are chosen so that as the radial distance of the stylus 45 is substantially equal to $r_1$, protuberance 62 nudges the arm 40 off the shelf 60, as shown in FIG. 3. As a result, the stylus 45 is free to engage the outer end of groove 35 of the record as the record 12 starts turning in a clockwise or Play direction.

Figure 4:
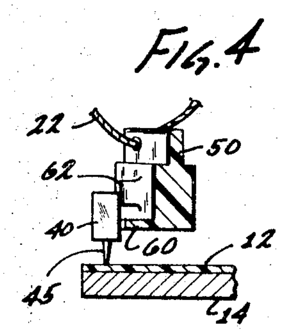
FIG. 4 is a cross-sectional view along lines 4–4 of FIG. 3.

FIG. 4 to which reference is made herein is a partial cross-sectional view of the tone arm 40 after it was nudged off shelf 60 so that the stylus 45 is free to engage the record 12. FIG. 4 is a cross-sectional view along lines 4—4 in FIG. 3.

As previously pointed out the lever 50 pivots about pivot 52 with sufficient frictional damping, provided therebetween, so that the lever remains stationary unless a force is applied thereto. During Rewind the pulled string 22 first biases the lever upwardly away from record 12, and then moves the lever outwardly toward the start of Play position (FIG. 3). As the string 22 is released and play starts, the lever is free to move toward the record 12. Obviously, the lever can be biased toward the record 12 by gravity or any other suitable means, not shown. During Play as the stylus follows one of the spiral grooves, as the record rotates in the Play direction, the arm 40 moves inwardly, pushing the lever 50 ahead of it in an inward direction, so that at the end of Play the two are in the inward position (FIG. 1). The relative positions of the tone arm 40 and the lever 50 during Play are diagrammed in FIG. 5, in which it is assumed that the stylus follows groove 31. Such an arrangement provides significant protection for the record from being scratched by the stylus, due to improper operation of the sound-reproducing device. For example, let it be assumed that after a portion of a Play cycle, long enough for the arm 40 and the lever 50 to have moved inwardly so that the shelf 60 is below the arm 40, a child improperly stops the Play cycle by pulling string 22. The string pulling would bias the lever upwardly and therewith raise the tone arm 40 so as to disengage the stylus from the record, thereby preventing any scratching thereof.

From the foregoing it should thus be apparent, that the tone arm 40/lever 50 combination results in the automatic stylus disengagement from the record at the end of Play or at any midpoint if the string is constrained or pulled such as to select another saying before finishing a first, and the rotation of the arm during Rewind, from the inner position (FIG. 1), which it assumes at the end of Play, to an exact outer position, which when reached results in the automatic engagement of the stylus with the record, even though the string is fully drawn. Such an arrangement is patentably distinguishable from prior art arrangements in which the stylus is disengaged from the record during Rewind, by the pulled string raising the tone arm away from the record. Also, at the end of the Rewind, as long as the string is taut, the stylus does not engage the record until Play starts when the string is released. The latter feature is particularly disturbing when saying selection is based on the selection, during Rewind, of the annular sector of the record which is positioned under the stylus and which the stylus has to engage before Play begins to ensure proper stylus engagement in a selected groove.

Summarizing the foregoing description, in accordance with the teachings of the present invention, at the end of Play, the lever 50 is in the inward position, shown in FIG. 1, where it was pushed by the tone arm 40 during Play. Then, when the string 22 becomes taut, the lever 50 is biased upwardly (see FIG. 2), thereby raising the tone arm which results in the disengagement of the stylus from the record. During Rewind, as the string 22 is drawn, the string pulls the lever 50, causing it to pivot counterclockwise to assume the outward position shown in FIG. 3. As the lever moves to its outward position, the shelf 60 is used to carry the tone arm to its outward position. When this position is reached, the tone arm is automatically nudged off the shelf 60 so that the stylus is free to engage the record. As long as the string remains taut, the lever 50 remains in its outward position. However, once the string is released, representing the start of Play, the biasing force previously referred to, forces the lever 50 towards the record 12 to a stop position just clear of the record. The string release also initiates the Play cycle, during which the record rotates with the stylus in engagement with one of the record grooves. Thus, during Play, the lever 50 is driven towards the inner position by the tone arm 40 while the stylus 45 in the tone arm 40 follows one of the selected sound grooves to produce the signals necessary for sound reproduction.

Although particular embodiments of the invention have been described and illustrated herein, it is recognized that modifications and variations may readily occur to those skilled in the art and consequently it is intended that the claims be interpreted to cover such modifications and equivalents.

What I claim is:

1. In a sound-reproducing device of the type for use in a toy or the like to reproduce any one of a plurality of sound sequences recorded on a recording medium, which is movable in said device during sound sequence reproduction from a first position to a second position, said device further including sound-reproducing means which include an element, biasable to contact said recording medium to generate signals as a function of the contract between the element and said medium as the medium moves from said first to said second position, an arrangement for controlling the engagement of said element with said medium comprising:

element positioning control means;

means for biasing said element positioning control means towards said medium, said element positioning control means including a portion locatable adjacent said sound-reproducing means; and manually operable means for engaging, when manually operated, said element positioning control means to move it away from said medium and towards a selected position, said portion engaging under a portion of said sound-reproducing means whereby the latter is also moved away from said medium and toward said second position with said element in disengagement from said medium, interengaging means on said control means and said reproducing means responsive to the relative motions of said element positioning control means and said sound-reproducing means being controlled so that when said element positioning control means reaches said selected position, the sound-reproducing means is disengaged from said portion to enable said element to contact said medium.

2. The arrangement as recited in claim 1 wherein said manually operable means, when manually operated, biases said element positioning control means, away from said medium to thereby move said sound-reproducing means away from said medium to disengage the element therefrom.

3. The arrangement as recited in claim 2 wherein said manually operable means is a drawstring.

4. In a sound-reproducing device for use in a toy or the like including a disclike record having recorded thereon at least one sound sequence in a selected continuous groove on said record having start and end points at start and end radial distances from the center of said record, a movable tone arm including a stylus for engaging the records groove to produce signals when said record is turning in a Play direction, said tone arm being biased toward said record, an arrangement for controlling the positioning of said tone arm for sound sequence reproduction comprising:

a pivotally mounted lever, including flange means for supporting said tone arm thereon, said lever being frictionally dampened whereby said lever assumes a first lever position adjacent the tone arm when the tone arm is in a first tone arm position in which the stylus is at said groove end point with said tone arm in juxtaposition with said flange means to be supported thereon; and operable means for engaging, when manually operated, said lever to pivot it to a second lever position, said flange means supporting said tone arm when said lever is moved toward said second lever position, the motions of said lever and tone arm and their shapes being controlled whereby the tone arm becomes disengaged from said flange means when said second lever position is reached, with the tone arm being in a second tone arm position in which said stylus engages the record at substantially at said start radial distance, so as to engage the start point of a selected groove.

5. The arrangement as recited in claim 4 wherein said operable means, when manually operated, bias said lever away from said record, whereby the tone arm is supported on said flange means and is biased away from said record so that the stylus is disengaged therefrom, when the tone arm is moved to said second tone arm position by said lever.

6. The arrangement as recited in claim 5 wherein said operable means comprises a manually pullable string which engages said lever when the string is pulled to bias said lever away from the record and toward said second lever position.

7. The arrangement as recited in claim 5 wherein said operable means bias said lever away from said record, after said record turned in said Play direction and said tone arm is in said first tone arm position, to cause said flange means to support said tone arm and bias it away from said record to disengage the stylus therefrom.

8. The arrangement as recited in claim 7 wherein said operable means comprises a manually pullable string which engages said lever, when the string pulled, to bias said lever away from the record and toward said second lever position.

9. The arrangement as recited in claim 5 wherein said tone arm has a first side which is parallel to and in juxtaposition with a first side of said lever when the tone arm and the lever are in their respective first positions, and the shelf means of said lever comprises a lever extension, extending from said lever first side and positioned under said tone arm when the lever and the tone arm are in their respective first positions, the relative size of said lever extension and its location being selected so that when the lever reaches said second lever position, the tone arm disengages the shelf to enable the tone arm to be biased against the record with the stylus being at said start radial distance.

10. The arrangement as recited in claim 9 wherein said lever further includes a protuberance extending from the lever first side to define a distance between the first sides of said lever and the tone arm when the two are in their respective first positions, and to apply a forward force to said tone arm first side as the tone arm is supported on the extension of said lever when the latter is moved to said second lever position to nudge the tone arm off the lever extension when said second lever position if reached.

11. In a sound-reproducing apparatus of the type for use in a toy or the like, a rotary disc having an exposed side provided with a series of independent congruent spiral sound grooves each having an end point and a start point, all the end and start points of said grooves being respectively located at substantially first and second radial distances from the center of said disc, a rewindable spring for rotating said disc in a Play direction, a device for winding said spring including a pullable flexible element which is taut when the spring is held against unwinding and which is slack when the spring unwinds to rotate said disc, and a tone arm including a stylus overlying said disc and being movable with the stylus between first and second positions in which the stylus is substantially at said first and second radial distances from the disc center respectively, said tone arm being biased toward said disc so that the stylus normally engages said disc to track a sound groove when the disc rotates in said Play direction, an arrangement for controlling the position of said tone arm and the engagement of the stylus with said disc comprising:

a movable frictionally dampened lever;

means for biasing said lever towards the record, said lever including a shelflike extension extending under said tone arm when said tone arm and said lever are in their respective first positions; and means included in said lever for engaging said string to move said lever to its second position when said flexible element is pulled, and for moving said lever away from said disc when the element is taut, said levers shelflike extension engaging said tone arm to bias it away from said disc to disengage the stylus from said disc whenever said lever is biased away from the disc, to thereby carry the tone arm to its second position when said lever is moved to its second position, the shapes of said tone arm, said lever and its shelflike extension and their relative positions with respect to one another when both are in their respective second positions being selected so that as said lever reaches its second position, the shelflike extension thereof is disengaged from said tone arm, whereby the latter is biased toward the disc to engage the stylus with said disc at substantially said first radial distance from the disc center.